United States Patent
Onishi

(10) Patent No.: US 9,120,981 B2
(45) Date of Patent: Sep. 1, 2015

(54) HYDROCARBON SYNTHESIS REACTION APPARATUS, HYDROCARBON SYNTHESIS REACTION SYSTEM, AND LIQUID HYDROCARBON RECOVERY METHOD

(75) Inventor: Yasuhiro Onishi, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 657 days.

(21) Appl. No.: 13/391,853

(22) PCT Filed: Aug. 12, 2010

(86) PCT No.: PCT/JP2010/063684
§ 371 (c)(1),
(2), (4) Date: Mar. 26, 2012

(87) PCT Pub. No.: WO2011/024650
PCT Pub. Date: Mar. 3, 2011

(65) Prior Publication Data
US 2012/0172458 A1    Jul. 5, 2012

(30) Foreign Application Priority Data

Aug. 31, 2009  (JP) ................................ 2009-200463

(51) Int. Cl.
*C10G 2/00*  (2006.01)

(52) U.S. Cl.
CPC *C10G 2/30* (2013.01); *C10G 2/342* (2013.01); *C10G 2/344* (2013.01); *B01J 2219/00006* (2013.01)

(58) Field of Classification Search
CPC ........................................................ C10G 2/344
USPC ................... 422/140, 614; 518/700, 702, 726
See application file for complete search history.

(56) References Cited

U.S. PATENT DOCUMENTS 2,483,771 A  *  10/1949  Holder ......................... 518/700
5,844,005 A  *  12/1998  Bauman et al. ............... 518/700
(Continued)

FOREIGN PATENT DOCUMENTS

| CN | 1293027 | 1/2007 |
|---|---|---|
| CN | 1977032 | 6/2007 |

(Continued)

OTHER PUBLICATIONS

International Search Report dated Sep. 7, 2010, issued in corresponding PCT Application No. PCT/JP2010/063684.
(Continued)

*Primary Examiner* — Lessanework Seifu
(74) *Attorney, Agent, or Firm* — Kenyon and Kenyon LLP

(57) ABSTRACT

A hydrocarbon synthesis reaction apparatus synthesizes hydrocarbons by a Fischer-Tropsch synthesis reaction. The apparatus includes a reactor; a flowing line; a first cooling unit; a second cooling unit; a first separating unit which separates the liquid hydrocarbons condensed by the first cooling unit from the gaseous hydrocarbons; and a second separating unit which separates the liquid hydrocarbons condensed by the second cooling unit from the gaseous hydrocarbons. The first cooling unit cools the hydrocarbons which flow through the flowing line to a temperature range equal to or lower than a condensing point at which a wax fraction condenses, and higher than a freezing point at which the wax fraction solidifies. The second cooling unit cools the hydrocarbons which flow through the flowing line to a temperature range lower than the temperature to which the gaseous hydrocarbons are cooled by the first cooling unit, and higher than a freezing point at which a middle distillate solidifies.

3 Claims, 1 Drawing Sheet

(56) References Cited

U.S. PATENT DOCUMENTS

| | | | | |
|---|---|---|---|---|
| 5,977,192 | A | * | 11/1999 | Howsmon et al. ............ 518/700 |
| 6,066,679 | A | * | 5/2000 | Leviness et al. ............ 518/709 |
| 7,115,668 | B2 | * | 10/2006 | Belmonte et al. ............ 518/700 |
| 2003/0109591 | A1 | | 6/2003 | Zhou et al. |
| 2008/0021118 | A1 | | 1/2008 | Inga et al. |
| 2008/0312347 | A1 | | 12/2008 | Ernst et al. |

FOREIGN PATENT DOCUMENTS

| | | |
|---|---|---|
| CN | 101475427 | 7/2009 |
| JP | 2002-527530 | 8/2002 |
| WO | 00/14184 | 3/2000 |
| WO | 2008/076865 | 6/2008 |

OTHER PUBLICATIONS

Luo Wei et al., "Research Progress of Fischer-Tropsch Synthesis for Column Slurry Reactors", Coal Chemical Industry, vol. 5, pp. 17-20, Oct. 31, 2008 [With English Abstract on p. 20].

Office Action dated Nov. 15, 2013 issued in corresponding Chinese Application No. 201080038000.0 [With English Translation].

* cited by examiner

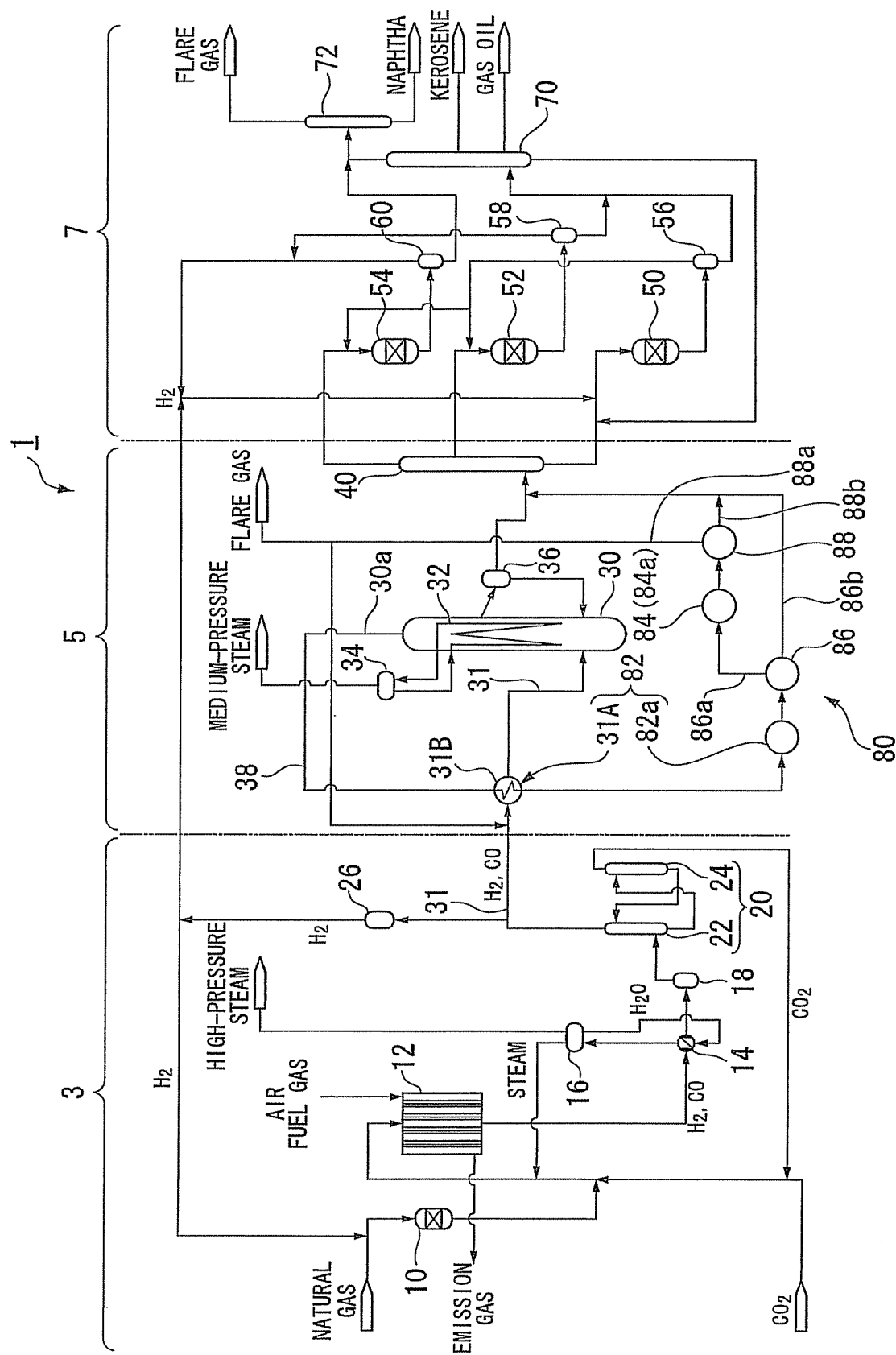

HYDROCARBON SYNTHESIS REACTION APPARATUS, HYDROCARBON SYNTHESIS REACTION SYSTEM, AND LIQUID HYDROCARBON RECOVERY METHOD

TECHNICAL FIELD

The present invention relates to a hydrocarbon synthesis reaction apparatus, a hydrocarbon synthesis reaction system, and a liquid hydrocarbon recovery method.

This application is a stage application of International Application No. PCT/JP2010/063684, filed Aug. 12, 2010, which claims priority to Japanese Patent Application No. 2009-200463 filed on Aug. 31, 2009, the contents of which are incorporated herein by reference.

BACKGROUND ART

In recent years, as one of the methods for synthesizing liquid fuels from natural gas, the GTL (Gas To Liquids: liquid fuel synthesis) technique has been developed. In the GTL technique, natural gas is reformed to produce a synthesis gas containing carbon monoxide gas (CO) and hydrogen gas ($H_2$) as main components, hydrocarbons are synthesized by the Fisher-Tropsch synthesis reaction (hereinafter referred to as "FT synthesis reaction") with a catalyst using the synthesis gas as a source gas, and the hydrocarbons are hydrogenated and fractionated to produce liquid fuel products, such as naphtha (crude gasoline), kerosene, gas oil, and wax.

Generally, in the FT synthesis reaction, liquid hydrocarbons and gaseous hydrocarbons with various carbon numbers are synthesized as the hydrocarbons. Production of liquid fuel base stocks from the hydrocarbons synthesized by the FT synthesis reaction is performed by fractionally distilling the liquid hydrocarbons among the synthesized hydrocarbons, and by hydrocracking or hydrotreating each of the obtained fractions. When the liquid fuel base stocks are produced, the liquid hydrocarbons are fractionally distilled into a wax fraction (the boiling point exceeds about 360° C., and the carbon number is mainly $C_{21}$ or more), a middle distillate equivalent to kerosene or gas oil (the boiling point is about 150 to 360° C., and the carbon number is mainly $C_{11}$ to $C_{20}$), and a naphtha fraction (the boiling point is lower than about 150° C., and the carbon number is mainly $C_5$ to $C_{10}$), depending on differences in boiling points (that is, differences in the carbon number).

Conventionally, as a hydrocarbon synthesis reaction apparatus which synthesizes hydrocarbons by the FT synthesis reaction, a configuration including a reactor which synthesizes hydrocarbons by the FT synthesis reaction by contacting a catalyst slurry having solid catalyst particles suspended in a liquid and a synthesis gas is known. In this reactor, as mentioned above, liquid hydrocarbons and gaseous hydrocarbons with various carbon numbers are synthesized as the hydrocarbons.

In the GTL process of producing liquid fuel base stocks from natural gas by the GTL technique, it is desired to improve the yield of the liquid fuel base stocks with regard to the natural gas which is a feedstock. Therefore, it is considered that, among the hydrocarbons synthesized in the reactor, not only the liquid hydrocarbons but also the gaseous hydrocarbons are used for production of the liquid fuel base stocks. Thus, as the hydrocarbon synthesis reaction apparatus, for example, as shown in the following PTL 1, there is known a configuration further including a flowing line through which the gaseous hydrocarbons flow to the downstream from the reactor, a cooling unit which cools the gaseous hydrocarbons which flow through the flowing line, and a separating unit which separates the liquid hydrocarbons condensed by the cooling unit from the gaseous hydrocarbons. In this configuration, the gaseous hydrocarbons synthesized in the reactor flow through the flowing line, and are cooled by the cooling unit, whereby some of the gaseous hydrocarbons are condensed into liquid hydrocarbons. Thereafter, in the separating unit, the condensed liquid hydrocarbons are separated from the lighter gaseous hydrocarbons. Thereby, it is possible to separate and recover some of the gaseous hydrocarbons synthesized in the reactor as liquid hydrocarbons, and it is possible to use the liquid hydrocarbons for production of liquid fuel base stocks.

As mentioned above, in the process of cooling and condensing the gaseous hydrocarbons by the cooling unit, gaseous hydrocarbons with a higher condensing point among the gaseous hydrocarbons are first condensed. Therefore, when classification is made on the basis of fractions of hydrocarbons in the production of the liquid fuel base stocks mentioned above, among the gaseous hydrocarbons, hydrocarbons of a wax fraction are first condensed, and hydrocarbons of a middle distillate are then condensed. In order to recover a large amount of liquid hydrocarbons from the gaseous hydrocarbons so that as many of the gaseous hydrocarbons can be used as possible for the production of the liquid fuel base stocks, it is desired to condense and separate not only the hydrocarbons of the wax fraction but also the hydrocarbons of the middle distillate.

CITATION LIST

Patent Literature

[PTL 1] Specification of US Patent Application Publication No. 2008-0021118

SUMMARY OF INVENTION

Technical Problem

However, in the above conventional hydrocarbon synthesis reaction apparatus, when the hydrocarbons in the flowing line are cooled by the cooling unit in order to condense the hydrocarbons of the middle distillate, the hydrocarbons of the wax fraction are also cooled together. Therefore, there is a problem in that the hydrocarbons of the wax fraction may be cooled to the freezing point or lower by the cooling unit to solidify, and may adhere to the inner surface of the pipe of the flowing line. As a result, the cooling capacity of the cooling unit may decrease and it may become difficult to cool the gaseous hydrocarbons, or the flowing line may be clogged, and the gaseous hydrocarbons may not be allowed to flow through the flowing line. That is, in the hydrocarbon synthesis reaction apparatus, it was not possible to condense the gaseous hydrocarbons in large quantities as liquid hydrocarbons to stably separate the condensed liquid hydrocarbons from the lighter gaseous hydrocarbons.

The invention was made in consideration of the aforementioned situation, and the object thereof is to provide a hydrocarbon synthesis reaction apparatus, a hydrocarbon synthesis reaction system, and a liquid hydrocarbon recovery method, capable of keeping hydrocarbons from solidifying and adhering to the inner surface of the pipe of the flowing line, and capable of condensing gaseous hydrocarbons in large quantities as liquid hydrocarbons to stably separate the condensed liquid hydrocarbons from the lighter gaseous hydrocarbons.

Solution to Problem

In order to solve the above problems, the invention suggests the following means.

The hydrocarbon synthesis reaction apparatus of the invention is a hydrocarbon synthesis reaction apparatus which synthesizes hydrocarbons by a Fischer-Tropsch synthesis reaction caused by contacting a synthesis gas including carbon monoxide gas and hydrogen gas as main components and catalyst slurry having solid catalyst particles suspended in a liquid. The apparatus includes a reactor which synthesizes liquid hydrocarbons and gaseous hydrocarbons by the Fischer-Tropsch synthesis reaction; a flowing line through which the gaseous hydrocarbons flow to the downstream from the reactor; a first cooling unit disposed in the flowing line to cool the gaseous hydrocarbons which flow through the flowing line; a second cooling unit disposed downstream of the first cooling unit in the flowing line; a first separating unit disposed between the first cooling unit and the second cooling unit in the flowing line to separate the liquid hydrocarbons condensed by the first cooling unit from the gaseous hydrocarbons; and a second separating unit which separates the liquid hydrocarbons condensed by the second cooling unit from the gaseous hydrocarbons. The first cooling unit cools the gaseous hydrocarbons which flow through the flowing line to a temperature range equal to or lower than a condensing point at which a wax fraction of the hydrocarbons condenses in the flowing line, and higher than the freezing point at which the wax fraction solidifies in the flowing line. The second cooling unit cools the gaseous hydrocarbons which flow through the flowing line to a temperature range lower than the temperature to which the gaseous hydrocarbons are cooled by the first cooling unit, and higher than the freezing point at which a middle distillate of the hydrocarbons solidifies in the flowing line.

Additionally, the liquid hydrocarbon recovery method of the invention is a liquid hydrocarbon recovery method of recovering gaseous hydrocarbons which flow through the flowing line as liquid hydrocarbons, in a hydrocarbon synthesis reaction apparatus including a reactor which synthesizes the liquid hydrocarbons and the gaseous hydrocarbons by the Fischer-Tropsch synthesis reaction by contacting a synthesis gas including carbon monoxide gas and hydrogen gas as main components and catalyst slurry having solid catalyst particles suspended in a liquid, and a flowing line through which the gaseous hydrocarbons flow to the downstream from the reactor. The hydrocarbon synthesis reaction apparatus includes a first cooling unit disposed in the flowing line to cool the gaseous hydrocarbons which flow through the flowing line; and a second cooling unit disposed downstream of the first cooling unit in the flowing line. The method includes cooling the gaseous hydrocarbons which flow through the of the flowing line to a temperature range equal to or lower than the condensing point at which the wax fraction of the hydrocarbons condenses in the flowing line, and higher than the freezing point at which the wax fraction solidifies in the flowing line by the first cooling unit; separating the liquid hydrocarbons condensed by the first cooling unit from the gaseous hydrocarbons, between the first cooling unit and the second cooling unit in the flowing line; cooling the gaseous hydrocarbons which flow through the flowing line to a temperature range lower than the temperature to which the gaseous hydrocarbons are cooled by the first cooling unit, and higher than the freezing point at which a middle distillate of the hydrocarbons solidifies in the flowing line; and separating the liquid hydrocarbons condensed by the second cooling unit from the gaseous hydrocarbons.

According to the invention, the first cooling unit does not cool the hydrocarbons which flow through the flowing line to a temperature equal to or lower than the freezing point at which the wax faction of the hydrocarbons solidifies in the flowing line. Thus, it is possible to keep the hydrocarbons of the wax fraction from solidifying and adhering to the inner surface of the pipe of the flowing line through the cooling by the first cooling unit.

On the other hand, the first cooling unit cools the hydrocarbons which flow through the flowing line to a temperature equal to or lower than a condensing point at which the wax fraction condenses in the flowing line. Thus, it is possible to condense the wax fraction of the gaseous hydrocarbons synthesized in the reactor, and the liquid hydrocarbons of the condensed wax fraction can be separated from lighter gaseous hydrocarbons by the first separating unit. Moreover, since the first separating unit is disposed between the first cooling unit and the second cooling unit in the flowing line, the liquid hydrocarbons can be separated from the lighter gaseous hydrocarbons by the first separating unit before the liquid hydrocarbons of the wax fraction are further cooled by the second cooling unit. Accordingly, it is possible to keep the hydrocarbons of the wax fraction from solidifying and adhering to the inner surface of the pipe of the flowing line through the cooling by the second cooling unit.

Additionally, the second cooling unit does not cool the hydrocarbons which flow through the flowing line to a temperature equal to or lower than the freezing point at which the middle distillate of the hydrocarbons solidifies in the flowing line. Thus, it is possible to keep the hydrocarbons of the middle distillate from solidifying and adhering to the inner surface of the pipe of the flowing line through the cooling by the second cooling unit.

On the other hand, the second cooling unit cools the hydrocarbons which flow through the flowing line to a temperature lower than the temperature to which the gaseous hydrocarbons are cooled by the first cooling unit. Thus, it is possible to condense the middle distillate of the gaseous hydrocarbons synthesized in the reactor, and the liquid hydrocarbons of the condensed middle distillate can be separated from the lighter gaseous hydrocarbons by the second separating unit.

As described above, the liquid hydrocarbons of the wax fraction and the liquid hydrocarbons of the middle distillate can be separated, respectively, from the gaseous hydrocarbons which flow through the flowing line. Moreover, it is possible to keep the hydrocarbons from solidifying and adhering to the inner surface of the pipe of the flowing line through the cooling by the first cooling unit and the second cooling unit.

Accordingly, there is no problem in that the cooling capacity of the cooling unit decreases and it becomes difficult to cool the gaseous hydrocarbons, or the flowing line is clogged, and the gaseous hydrocarbons is not allowed to flow through the flowing line, and it is possible to condense the gaseous hydrocarbons in large quantities as liquid hydrocarbons to stably separate the condensed liquid hydrocarbons from the lighter gaseous hydrocarbons. As a result, a large amount of liquid hydrocarbons can be stably recovered on the basis of the FT synthesis reaction in the reactor.

Additionally, the first cooling unit may coot the gaseous hydrocarbons which flow through the flowing line to 120° C. or lower and 110° C. or higher, and the second cooling unit cools the gaseous hydrocarbons which flow through the flowing line to a temperature lower than the temperature to which the gaseous hydrocarbons arc cooled by the first cooling unit and 40° C. or higher.

In this case, since the first cooling unit cools the hydrocarbons which flow through the flowing line to 120° C. or lower and 110° C. or higher, and the second cooling unit cools the hydrocarbons which flow through the flowing line to a temperature lower than the temperature to which the gaseous hydrocarbons are cooled by the first cooling unit and 40° C. or higher, the aforementioned effects can be reliably exhibited.

Additionally, the second cooling unit may cool the hydrocarbons which flow through the flowing line to 75° C. or lower and 40° C. or higher.

In this case, since the second cooling unit cools the hydrocarbons which flow through the flowing line to 75° C. or lower and 40° C. or higher, it is possible to condense the middle distillate of the gaseous hydrocarbons synthesized in the reactor in large quantities, and the liquid hydrocarbons of the condensed middle distillate can be separated from the lighter gaseous hydrocarbons by the second separating unit. Accordingly, the gaseous hydrocarbons can be condensed in significantly larger quantities as liquid hydrocarbons, and the condensed liquid hydrocarbons can be separated from the lighter gaseous hydrocarbons.

Additionally, the hydrocarbon synthesis reaction system according to the invention includes the hydrocarbon synthesis reaction apparatus according to the invention, a synthesis gas production unit which reforms a hydrocarbon feedstock to produce the synthesis gas and supplies the synthesis gas to the reactor, an upgrading unit which refines the liquid hydrocarbons to produce liquid fuel base stocks.

Since the hydrocarbon synthesis reaction system according to the invention includes the hydrocarbon synthesis reaction apparatus related to the invention, the gaseous hydrocarbons synthesized in the reactor can be condensed in large quantities as liquid hydrocarbons, and the condensed liquid hydrocarbons can be separated from lighter gaseous hydrocarbons. Thereby, it is possible to stably recover the liquid hydrocarbons, which are to be used to produce liquid fuel base stocks in the upgrading unit, in large quantities in the hydrocarbon synthesis reaction apparatus, and a large amount of liquid fuel base stocks can be stably produced from the liquid hydrocarbons.

Advantageous Effects of Invention

According to the invention, it is possible to keep the hydrocarbons from solidifying and adhering to the inner surface of the pipe of the flowing line, and it is possible to condense the gaseous hydrocarbons in large quantities as liquid hydrocarbons to stably separate the condensed liquid hydrocarbons from the lighter gaseous hydrocarbons.

BRIEF DESCRIPTION OF DRAWINGS

FIG. 1 is a schematic diagram showing the overall configuration of liquid fuel synthesizing system according to one embodiment of the invention.

DESCRIPTION OF EMBODIMENTS

Hereinafter, liquid fuel synthesizing system according to one embodiment of the invention will be described with reference to FIG. 1.

As shown in FIG. 1, the liquid fuel synthesizing system (hydrocarbon synthesis reaction system) 1 is a plant facility which carries out the GTL process which converts a hydrocarbon feedstock, such as natural gas, into liquid fuels. This liquid fuel synthesizing system 1 includes a synthesis gas production unit 3, an FT synthesis unit (hydrocarbon synthe-sis reaction apparatus) 5, and an upgrading unit 7. The synthesis gas production unit 3 reforms natural gas, which is a hydrocarbon feedstock, to produce a synthesis gas including carbon monoxide gas and hydrogen gas. The FT synthesis unit 5 produces liquid hydrocarbons from the produced synthesis gas by the FT synthesis reaction. The upgrading unit 7 hydrogenates and fractionates the liquid hydrocarbons produced by the FT synthesis reaction to produce base stocks of liquid fuel products (naphtha, kerosene, gas oil, wax, or the like) (liquid fuel base stocks).

Hereinafter, components of these respective units will be described.

First, the synthesis gas production unit 3 will be described. The synthesis gas production unit 3 mainly includes, for example, a desulfurization reactor 10, a reformer 12, a waste heat boiler 14, gas-liquid separators 16 and 18, a $CO_2$ removal unit 20, and a hydrogen separator 26.

The desulfurization reactor 10 is composed of a hydrodesulfurizer, or the like, and removes sulfur components from natural gas which is a feedstock. The reformer 12 reforms the natural gas supplied from the desulfurization reactor 10, to produce a synthesis gas including carbon monoxide gas (CO) and hydrogen gas ($H_2$) as main components. The waste heat boiler 14 recovers waste heat of the synthesis gas produced in the reformer 12 to generate high-pressure steam. The gas-liquid separator 16 separates the water heated by the heat exchange with the synthesis gas in the waste heat boiler 14 into gas (high-pressure steam) and liquid. The gas-liquid separator 18 removes condensed fractions from the synthesis gas cooled in the waste heat boiler 14, and supplies a gas component to the $CO_2$ removal unit 20. The $CO_2$ removal unit 20 has an absorption tower 22 which removes carbon dioxide gas by using an absorbent from the synthesis gas supplied from the gas-liquid separator 18, and a regeneration tower 24 which diffuses the carbon dioxide gas from the absorbent containing the carbon dioxide gas to regenerate the absorbent. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 may be not provided depending on the circumstances.

Among them, the reformer 12 reforms natural gas by using carbon dioxide and steam to produce a high-temperature synthesis gas including carbon monoxide gas and hydrogen gas as main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (POX) using oxygen, an autothermal reforming method (ATR) which is a combination of the partial oxidation reforming method and the steam reforming method, a carbon-dioxide-gas reforming method, and the like can also be utilized.

$$CH_4 + H_2O \rightarrow CO + 3H_2 \quad (1)$$

$$CH_4 + CO_2 \rightarrow 2CO + 2H_2 \quad (2)$$

Additionally, the hydrogen separator 26 is provided on a line branching from a synthesis gas supply line 31 which connects the $CO_2$ removal unit 20 or gas-liquid separator 18 with the bubble column reactor 30. This hydrogen separator 26 can be composed of, for example, a hydrogen PSA (Pressure Swing Adsorption) device which performs adsorption and desorption of impurity gasses included in hydrogen gas by using a pressure difference. This hydrogen PSA device has adsorbents (zeolitic adsorbent, activated carbon, alumina, silica gel, or the like) within a plurality of adsorption towers (not shown) which are arranged in parallel. By sequentially repeating process including pressurizing, adsorption, desorption (depressurization), and purging of hydrogen gas which includes impurity gases in each of the adsorption towers, high-purity (for example, about 99.999%) hydrogen gas separated from the synthesis gas can be continuously supplied to a reactor.

In addition, the hydrogen gas separating method in the hydrogen separator 26 is not limited to the example of the pressure swing adsorption method as in the above hydrogen PSA device. For example, there may be a hydrogen storing alloy adsorption method, a membrane separation method, or a combination thereof.

The hydrogen storing alloy method is, for example, a technique of separating hydrogen gas using a hydrogen storing alloy (TiFe, LaNi$_5$, TiFe$_{0.7\ to\ 0.9}$, Mn$_{0.3\ to\ 0.1}$, TiMn$_{1.5}$, or the like) having a property which adsorbs or emits hydrogen gas by being cooled or heated. By providing a plurality of adsorption towers in which a hydrogen storing alloy is stored, and alternately repeating, in each of the adsorption towers, adsorption of hydrogen gas by cooling of the hydrogen storing alloy and emission of hydrogen gas by heating of the hydrogen storing alloy, hydrogen gas in the synthesis gas can be separated and recovered.

Additionally, the membrane separation method is a technique of separating hydrogen gas having excellent membrane permeability out of a mixed gas, using a membrane made of a polymeric material, such as aromatic polyimide. Since this membrane separation method is not accompanied with a phase change, less energy is required for running, and the running costs are low. Additionally, since the structure of a membrane separation device is simple and compact, low equipment costs are required and the required installation area is also smaller. Additionally, since there is no driving device in a separation membrane, and the stable running range is wide, it has the advantage that maintenance and management are easy.

Next, the FT synthesis unit 5 will be described. The FT synthesis unit 5 mainly includes, for example, the bubble column reactor 30, a gas-liquid separator 34, a separator 36, a flowing line 38, and a first fractionator 40.

The bubble column reactor 30, which is an example of a reactor which converts a synthesis gas into liquid hydrocarbons (synthesizes liquid hydrocarbons from a synthesis gas), functions as an FT synthesis reactor which synthesizes liquid hydrocarbons from a synthesis gas by the FT synthesis reaction. The bubble column reactor 30 is composed of, for example, a bubble column slurry bed type reactor in which catalyst slurry consisting mainly of catalyst particles and medium oil is stored in a tower vessel. This bubble column reactor 30 produces gaseous hydrocarbons and liquid hydrocarbons from a synthesis gas by the FT synthesis. In detail, in this bubble column reactor 30, the synthesis gas which is a source gas supplied from the synthesis gas supply line 31 is supplied as bubbles from a spager at the bottom of the bubble column reactor 30, and passes through the catalyst slurry, and in a suspended state, hydrogen gas and carbon monoxide gas react with each other, as shown in the following chemical reaction formula (3).

$$2nH_2 + nCO \rightarrow (-CH_2-)_n + nH_2O \qquad (3)$$

Additionally, in the present embodiment, a heat exchanger 31A which heats the synthesis gas which flows through the synthesis gas supply line 31 is provided in the synthesis gas supply line 31. The synthesis gas supplied to the bubble column reactor 30 from the synthesis gas supply line 31 is heated to a temperature suitable for the FT synthesis reaction by this heat exchanger 31A, and is supplied to the bubble column reactor 30.

Since the FT synthesis reaction is an exothermic reaction, the bubble column reactor 30 is of a heat-exchanger type which has the heat transfer pipe 32 disposed therein. For example, water (BFW: Boiler Feed Water) is supplied to the heat transfer pipe 32 as a coolant so that the reaction heat of the above FT synthesis reaction can be recovered as medium-pressure steam by the heat exchange between the catalyst slurry and water.

The gas-liquid separator 34 separates the water flowed and heated through the heat transfer pipe 32 disposed within the bubble column reactor 30 into steam (medium-pressure steam) and liquid. The separator 36, which is an example of a filtering unit which separates the catalyst particles and the liquid hydrocarbons in the catalyst slurry, is arranged outside the bubble column reactor 30.

The flowing line 38 allows to flow the gaseous hydrocarbons to the downstream from the bubble column reactor 30. In the present embodiment, an upstream end of the flowing line 38 is connected to the top of the bubble column reactor 30, and the gaseous hydrocarbons and the unreacted synthesis gas flow through this flowing line 38. Additionally, in the illustrated example, a downstream end of the flowing line 38 branches, and the one branching end is connected to the synthesis gas supply line 31.

The flowing line 38 constitutes a portion of the hydrocarbon liquefying and separating unit 80 which cools and condenses the gaseous hydrocarbons which flow through this flowing line 38, into liquid hydrocarbons, and thereby separates the liquid hydrocarbons from lighter gaseous hydrocarbons. This hydrocarbon liquefying and separating unit 80 will be described later.

The first fractionator 40 fractionally distills the liquid hydrocarbons supplied via the separator 36 and the hydrocarbon liquefying and separating unit 80 into individual fractions according to their boiling points. In addition, the separator 36 may be arranged within the bubble column reactor 30.

The upgrading unit 7 will be described. The upgrading unit 7 includes, for example, a wax fraction hydrocracking reactor 50, a middle distillate hydrotreating reactor 52, a naphtha fraction hydrotreating reactor 54, gas-liquid separators 56, 58, and 60, a second fractionator 70, and a naphtha stabilizer 72. The wax fraction hydrocracking reactor 50 is connected to a bottom of the first fractionator 40. The middle distillate hydrotreating reactor 52 is connected to a middle part of the first fractionator 40. The naphtha fraction hydrotreating reactor 54 is connected to a top of the first fractionator 40. The gas-liquid separators 56, 58 and 60 are provided so as to correspond to the hydrogenation reactors 50, 52 and 54, respectively. The second fractionator 70 fractionally distills the liquid hydrocarbons supplied from the gas-liquid separators 56 and 58 depending on boiling points. The naphtha stabilizer 72 fractionates liquid hydrocarbons of a naphtha fraction supplied from the gas-liquid separator 60 and the second fractionator 70, to discharge butane and components lighter than butane as a flare gas, and to recover components having a carbon number of five or more as a naphtha product.

Next, a process (GTL process) of producing liquid fuel base stocks from natural gas by the liquid fuel synthesizing system 1 configured as above will be described.

Natural gas (the main component of which is CH$_4$) as a hydrocarbon feedstock is supplied to the liquid fuel synthesizing system 1 from an external natural gas supply source (not shown), such as a natural gas field or a natural gas plant. The above synthesis gas production unit 3 reforms this natural gas to produce a synthesis gas (mixed gas including carbon monoxide gas and hydrogen gas as main components).

Specifically, first, the above natural gas is supplied to the desulfurization reactor 10 along with the hydrogen gas separated by the hydrogen separator 26. The desulfurization reactor 10 desulfurizes the natural gas by converting sulfur components included in the natural gas to a hydrogen sulfide using the hydrogen gas with a known hydrodesulfurizaiton catalyst, and by absorbing the generated hydrogen sulfide with an absorber such as ZnO. By desulfurizing natural gas in advance in this way, the activity of catalysts used in the reformer 12, the bubble column reactor 30, or the like can be prevented from being reduced due to the sulfur components.

The natural gas (may also include carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed. The reformer 12 reforms natural gas using carbon dioxide and steam to produce a high-temperature synthesis gas including carbon monoxide gas and hydrogen gas as main components, by the above steam and carbon-dioxide-gas reforming method. At this time, the reformer 12 is supplied with, for example, fuel gas for a burner provided in the reformer 12 and air, and reaction heat required for the above steam and carbon-dioxide-gas reforming reaction which is an endothermic reaction is provided by the heat of combustion of the fuel gas in the burner.

The high-temperature synthesis gas (for example, 900° C., 2.0 MPaG) produced in the reformer 12 in this way is supplied to the waste heat boiler 14, and is cooled by the heat exchange with the water which flows through the waste heat boiler 14 (for example, 400° C.), thereby recovering the waste heat. At this time, the water heated by the synthesis gas in the waste heat boiler 14 is supplied to the gas-liquid separator 16. From this gas-liquid separator 16, a gas component is supplied to the reformer 12 or other external devices as high-pressure steam (for example, 3.4 to 10.0 MPaG), and water as a liquid component is returned to the waste heat boiler 14.

Meanwhile, the synthesis gas cooled in the waste heat boiler 14 is supplied to the absorption tower 22 of the $CO_2$ removal unit 20, or the bubble column reactor 30, after condensed fractions are separated and removed in the gas-liquid separator 18. The absorption tower 22 removes the carbon dioxide gas from the synthesis gas by absorbing the carbon dioxide gas contained in the synthesis gas with an absorbent reserved therein. The absorbent including the carbon dioxide gas within this absorption tower 22 is brought to the regeneration tower 24, the absorbent including the carbon dioxide gas is heated and subjected to stripping treatment with, for example, steam, and the resulting diffused carbon dioxide gas is sent to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio suitable for the FT synthesis reaction (for example, $H_2:CO=2:1$ (molar ratio)). In addition, the pressure of the synthesis gas supplied to the bubble column reactor 30 is raised to a pressure suitable for the FT synthesis reaction (for example, about 3.6 MPaG) by a compressor (not shown) provided in the synthesis gas supply line 31.

Additionally, a portion of the synthesis gas, from which the carbon dioxide gas has been separated by the above $CO_2$ removal unit 20, is supplied also to the hydrogen separator 26. The hydrogen separator 26 separates the hydrogen gas contained in the synthesis gas, by the adsorption and desorption (hydrogen PSA) utilizing a pressure difference as described above. This separated hydrogen gas is continuously supplied from a gas holder or the like (not shown) via a compressor (not shown) to various hydrogen-utilizing reaction devices in the liquid fuel synthesizing system 1 (for example, the desulfurization reactor 10, the wax fraction hydrocracking reactor 50, the middle distillate hydrotreating reactor 52, the naphtha fraction hydrotreating reactor 54, or the like) which perform predetermined reactions by utilizing hydrogen gas.

Next, the above FT synthesis unit 5 synthesizes liquid hydrocarbons and gaseous hydrocarbons by the FT synthesis reaction from the synthesis gas produced in the above synthesis gas production unit 3.

Specifically, the synthesis gas from which the carbon dioxide gas has been separated in the above $CO_2$ removal unit 20 flows into the bubble column reactor 30 from the bottom, and flows up in the catalyst slurry stored within the bubble column reactor 30. At this time, within the bubble column reactor 30, the carbon monoxide gas and hydrogen gas which are contained in the synthesis gas react with each other by the FT synthesis reaction, thereby producing hydrocarbons. Additionally, by flowing water through the heat transfer pipe 32 in the bubble column reactor 30 at the time of this synthesis reaction, the reaction heat of the FT synthesis reaction is removed, and a portion of the water heated by this heat exchange is vaporized into steam. Among the steam and water, the water separated in the gas-liquid separator 34 is returned to the heat transfer pipe 32, and a gas component is supplied to external devices as medium-pressure steam (for example, 1.0 to 2.5 MPaG).

The liquid hydrocarbons synthesized in the bubble column reactor 30 in this way are discharged as catalyst slurry from the middle part of the bubble column reactor 30, and are brought to the separator 36. The separator 36 separates the discharged catalyst shiny into catalyst particles (a solid component), and a liquid component containing a liquid hydrocarbon product. Some of the separated catalyst particles are returned to the bubble column reactor 30, and the liquid component is supplied to the first fractionator 40. From the top of the bubble column reactor 30, an unreacted synthesis gas, and a gas component of the synthesized hydrocarbons are introduced into the flowing line 38. The hydrocarbon liquefying and separating unit 80 cools these gases to separate and recover some condensed liquid hydrocarbons, and introduce the condensed liquid hydrocarbons into the first fractionator 40. Meanwhile, most of the gas component from which liquid hydrocarbons have been separated by the hydrocarbon liquefying and separating unit 80, being mainly composed of the unreacted synthesis gas and hydrocarbons of $C_4$ or lighter, is returned to the bottom of the bubble column reactor 30, and the unreacted synthesis gas therein is reused for the FT synthesis reaction. In addition, the remaining gas component may be used as fuel gas of the reformer 12, or may be introduced into an external combustion facility (not shown) to be combusted therein, and then to be emitted to the atmosphere.

Next, the first fractionator 40 fractionally distills the liquid hydrocarbons (the carbon numbers of which are various) supplied via the separator 36 and the hydrocarbon liquefying and separating unit 80, respectively, from the bubble column reactor 30 as described above, into a naphtha fraction (the boiling point of which is lower than about 150° C.), a middle distillate equivalent to kerosene and gas oil fraction (the boiling point of which is about 150 to 360° C.), and a wax fraction (the boiling point of which is higher than about 360° C.).

Liquid hydrocarbons of the wax fraction discharged from the bottom of this first fractionator 40 (mainly $C_{21}$ or more) are brought to the wax fraction hydrocracking reactor 50. Liquid hydrocarbons of the middle distillate equivalent to kerosene and gas oil fraction discharged from the middle part of the first fractionator 40 (mainly $C_{11}$ to $C_{20}$) are brought to the middle distillate hydrotreating reactor 52. Liquid hydrocarbons of the naphtha fraction discharged from the upper part of the first fractionator 40 (mainly $C_5$ to $C_{10}$) are brought to the naphtha fraction hydrotreating reactor 54.

The wax fraction hydrocracking reactor 50 hydrocracks the liquid hydrocarbons of the wax fraction with a large carbon number (approximately $C_{21}$ or more), which has been discharged from the bottom of the first fractionator 40, using the hydrogen gas supplied from the above hydrogen separator 26, to reduce the carbon number of the hydrocarbons to approximately 20 or less. In this hydrocracking reaction, hydrocarbons with a small carbon number (with low molecular weight) are produced by cleaving C—C bonds of the hydrocarbons with a large carbon number, using a catalyst and heat. A product containing the liquid hydrocarbons obtained by hydrocracking in this wax fraction hydrocracking reactor 50 is separated into gas and liquid in the gas-liquid separator 56, and the liquid hydrocarbons of which are brought to the second fractionator 70, and the gas component (containing hydrogen gas) of which is brought to the middle distillate hydrotreating reactor 52 and the naphtha fraction hydrotreating reactor 54.

The middle distillate hydrotreating reactor 52 hydrotreats the liquid hydrocarbons of the middle distillate equivalent to kerosene and gas oil fraction having a middle carbon number (approximately $C_{11}$ to $C_{20}$), which have been discharged from the middle part of the first fractionator 40, using the hydrogen gas supplied via the wax fraction hydrocracking reactor 50 from the hydrogen separator 26. In this hydrotreating reaction, mainly in order to obtain branched saturated hydrocarbons, the liquid hydrocarbons are isomerized, and hydrogen is added to unsaturated bonds of the above liquid hydrocarbons to saturate the liquid hydrocarbons. As a result, a product containing the hydrotreated liquid hydrocarbons is separated into gas and liquid in the gas-liquid separator 58, the liquid hydrocarbons of which are brought to the second fractionator 70, and the gas component (containing hydrogen gas) of which is reused for the above hydrogenation reactions.

The naphtha fraction hydrotreating reactor 54 hydrotreats liquid hydrocarbons of the naphtha fraction with a low carbon number (approximately $C_{10}$ or less), which have been discharged from the top of the first fractionator 40, using the hydrogen gas supplied via the wax fraction hydrocracking reactor 50 from the hydrogen separator 26. As a result, a product containing the hydrotreated liquid hydrocarbons is separated into gas and liquid in the gas-liquid separator 60, the liquid hydrocarbons of which are brought to the naphtha stabilizer 72, and the gas component (containing hydrogen gas) of which is reused for the above hydrogenation reactions.

Next, the second fractionator 70 fractionally distills the liquid hydrocarbons supplied from the wax fraction hydrocracking reactor 50 and the middle distillate hydrotreating reactor 52 as described above into hydrocarbons with a carbon number of approximately 10 or less (the boiling point of which is lower than about 150° C.), kerosene fraction (the boiling point of which is about 150 to 250° C.), gas oil fraction (the boiling point of which is about 250 to 360° C.), and an uncracked wax fraction from the wax fraction hydrocracking reactor 50 (the boiling point of which is higher than about 360° C.). The uncracked wax fraction is obtained from the bottom of the second fractionator 70, and is recycled to the upstream of the wax fraction hydrocracking reactor 50. Kerosene fraction and gas oil fraction are discharged from the middle part of the second fractionator 70. Meanwhile, hydrocarbons with a carbon number of approximately 10 or less are discharged from the top of the second fractionator 70, and are supplied to the naphtha stabilizer 72.

Moreover, the naphtha stabilizer 72 fractionally distills the hydrocarbons with a carbon number of approximately 10 or less which have been supplied from the above naphtha fraction hydrotreating reactor 54 and second fractionator 70 to obtain naphtha ($C_5$ to $C_{10}$) as a product. Accordingly, high-purity naphtha is discharged from a bottom of the naphtha stabilizer 72. Meanwhile, the gas other than products (flare gas), which contains hydrocarbons with a carbon number equal to or less than a predetermined number (equal to or less than $C_4$) as a main component, is discharged from the top of the naphtha stabilizer 72. This gas may be used as the fuel gas of the reformer 12, may be recovered as LPG (not shown), and may be introduced into an external fuel facility (not shown) to be combusted therein and to be then emitted to the atmosphere.

Next, the hydrocarbon liquefying and separating unit 80 included in the FT synthesis unit 5 shown above will be described.

The hydrocarbon liquefying and separating unit 80 includes the flowing line 38, a first cooling unit 82 and a second cooling unit 84 disposed in the flowing line 38 to cool the hydrocarbons which flow through the flowing line 38, a first gas-liquid separator (a first separating unit) 86 disposed between the first cooling unit 82 and the second cooling unit 84 in the flowing line 38, and a second gas-liquid separator (a second separating unit) 88 disposed downstream of the second cooling unit 84 in the flowing line 38.

The first cooling unit 82 is constituted by the heat exchanger 31A, and a cooler 82a disposed downstream of the heat exchanger 31A in the flowing line 38.

The heat exchanger 31A includes an interposed part 31B interposed in the synthesis gas supply line 31, and this interposed part 31B constitutes a part of the flowing line 38. Also, the gaseous hydrocarbons and the unreacted synthesis gas which flow through the interposed part 31B are cooled as heat exchange is performed between the gaseous hydrocarbons and the unreacted synthesis gas which flows through the interposed portion 31B and the synthesis gas which flows through the part of the synthesis gas supply line 31 in which the interposed part 31B is interposed. The cooler 82a is interposed in the flowing line 38, has a coolant flowing therethrough, and constitutes a part of a heat exchanger which performs heat exchange with the gaseous hydrocarbons and the unreacted synthesis gas flowing through the flowing line 38, and water of, for example; 90° C. flows into the cooler as the coolant.

In the first cooling unit 82 configured in this way, the gaseous hydrocarbons and the unreacted synthesis gas which are discharged from an outlet 30a of the bubble column reactor 30 and flow through the flowing line 38 are cooled.

The first gas-liquid separator 86 separates the liquid hydrocarbons condensed by the first cooling unit 82 from the gaseous hydrocarbons. In the present embodiment, the first gas-liquid separator 86 is provided with a first gas outlet 86a through which the gaseous hydrocarbons separated from the liquid hydrocarbons by this first gas-liquid separator 86 flow, a first liquid outlet 86b through which the liquid hydrocarbons separated from the gaseous hydrocarbons by the first gas-liquid separator 86 flow, and a flow line (not shown) through which the water which has been generated as a by-product by the FT synthesis reaction and has been separated from the hydrocarbons by the first gas-liquid separator 86 flows. The first gas outlet 86a is constituted with the part of the flowing line 38 which is located downstream of the first gas-liquid separator 86 and is located upstream of the second cooling unit 84. Additionally, the first liquid outlet 86b allows the liquid hydrocarbons separated from the gaseous hydrocarbons to flow toward the first fractionator (liquid hydrocarbon recovery unit) 40 therethrough, and allows the liquid hydrocarbons to be supplied to and recovered by the first fractionator 40.

The second cooling unit 84 is disposed downstream of the first cooling unit 82 in the flowing line 38. In the present embodiment, the second cooling unit 84 is interposed in the flowing line 38, has a coolant flowing therethrough, and is constituted with a cooler 84a which constitutes a part of a heat exchanger which performs heat exchange with the gaseous hydrocarbons flowing through the flowing line 38.

The second gas-liquid separator 88 separates the liquid hydrocarbons condensed by the second cooling unit 84 from the gaseous hydrocarbons. In the present embodiment, the second gas-liquid separator 88 is provided with a second gas outlet 88a through which the gaseous hydrocarbons separated from the liquid hydrocarbons by this second gas-liquid separator 88 flow, a second liquid outlet 88b through which the liquid hydrocarbons separated from the gaseous hydrocarbons by the second gas-liquid separator 88 flow, and a flow line (not shown) through which the water which has been generated as a by-product by the FT synthesis reaction and has been separated from the hydrocarbons by the second gas-liquid separator 88 flows. The second gas outlet 88a is constituted with the part of the flowing line 38 which is located downstream of the second gas-liquid separator 88. Additionally, the second liquid outlet 88b allows the liquid hydrocarbons separated from the gaseous hydrocarbons to flow toward the first fractionator 40 therethrough, and allows the liquid hydrocarbons to be supplied to and recovered by the first fractionator 40.

The first cooling unit 82 cools the gaseous hydrocarbons which flow through the flowing line 38 to a temperature range equal to or lower than a condensing point at which the wax fraction of the hydrocarbons condenses in the flowing line 38, and higher than the freezing point at which the wax fraction solidifies in the flowing line 38. In the present embodiment, the first cooling unit 82 cools the hydrocarbons which flow through the flowing line 38 to 120° C. or lower and 110° C. or higher, preferably, 120° C. or lower and 115° C. or higher. In the illustrated example, the heat exchanger 31A cools the gaseous hydrocarbons which has flowed through the outlet 30a of the bubble column reactor 30 (for example, about 230° C.) to about 153° C., and the cooler 82a is cooled down to about 110° C.

In addition, the temperature of the hydrocarbons cooled by the first cooling unit 82 unit means the average temperature of the hydrocarbons after having flowed through the part of the flowing line 38 in which the first cooling unit 82 is disposed, in other words, it means the average temperature of the hydrocarbons which flow through the part of the flowing line 38 which is located at downstream in the vicinity of the first cooling unit 82.

The second cooling unit 84 cools the gaseous hydrocarbons which flow through the flowing line 38 to a temperature range lower than the temperature to which the gaseous hydrocarbons are cooled by the first cooling unit 82, and higher than the freezing point at which the middle distillate of the hydrocarbons solidify in the flowing line 38. In the present embodiment, the second cooling unit 84 cools the gaseous hydrocarbons, which flow through the flowing line 38, to a lower temperature than the temperature to which the gaseous hydrocarbons are cooled by the first cooling unit 82 and 40° C. or higher, preferably 75° C. or lower and 40° C. or higher. In the illustrated example, the second cooling unit 84 cools the gaseous hydrocarbons, which have flowed through the first gas outlet 86a, to about 45° C., for example.

In addition, the temperature of the hydrocarbons cooled by the second cooling unit 84 means the average temperature of the hydrocarbons after having flowed through the part of the flowing line 38 in which the second cooling unit 84 is disposed, in other words, it means the average temperature of the hydrocarbons which flow through the part of the flowing line 38 which is located at downstream in the vicinity of the second cooling unit 84.

Here, regarding the hydrocarbons synthesized in the bubble column reactor 30 by the FT synthesis reaction, the relationship between the carbon number and the freezing point is shown in Table 1.

TABLE 1

| Carbon number | Freezing point (° C.) |
|---|---|
| 30 to | 66 to 106 |
| 25 to 29 | 53 to 64 |
| 21 to 24 | 40 to 51 |
| 15 to 20 | 10 to 36 |
| 11 to 14 | −26 to 6 |
| 5 to 10 | −129 to −30 |
| 1 to 4 | −190 to −138 |

As shown in Table 1, the highest freezing point among the hydrocarbons of the wax fraction ($C_{21}$ or more) is 106° C. ($C_{100}H_{202}$), and the highest freezing point among the hydrocarbons of the middle distillate (mainly $C_{11}$ to $C_{20}$) is 36° C. ($C_{20}H_{42}$). In addition, the freezing points shown in Table 1 represent freezing points at the normal pressure of individual hydrocarbons.

Next, the process of condensing some of the gaseous hydrocarbons synthesized in the bubble column reactor 30, and separating liquid hydrocarbons from the lighter gaseous hydrocarbons, through the hydrocarbon liquefying and separating unit 80 having the configuration as described above, will be described.

First, the gaseous hydrocarbons which have been discharged via the outlet 30a of the bubble column reactor 30 from the bubble column reactor 30 flow through the flowing line 38 and are cooled by the first cooling unit 82, and some of the gaseous hydrocarbons are condensed as liquid hydrocarbons. Thereafter, the liquid hydrocarbons are separated from the gaseous hydrocarbons by the first gas-liquid separator 86.

Here, in the present embodiment, since the heat exchanger 31A constitutes at least a part of the first cooling unit 82, it is possible to heat the synthesis gas and cool the gaseous hydrocarbons by a heat exchange between the synthesis gas which flows through the synthesis gas supply line 31 and the gaseous hydrocarbons which flow through the flowing line 38. Accordingly, energy saving and space saving can be achieved, compared to, for example, a case where a heating unit is provided in the synthesis gas supply line 31, and a cooling unit is provided in the flowing line 38.

Next, the gaseous hydrocarbons from which the liquid hydrocarbons have been separated by the first gas-liquid separator 86 flow through the flowing line 38 (first gas outlet 86a), and are cooled by the second cooling unit 84, and some of the gaseous hydrocarbons are condensed as liquid hydrocarbons. Thereafter, the liquid hydrocarbons are separated by the second gas-liquid separator 88.

Also, in the present embodiment, the liquid hydrocarbons separated from the gaseous hydrocarbons by the first gas-liquid separator 86 and the second gas-liquid separator 88, respectively, flow through the liquid outlets 86b and 88b, respectively, are then supplied to and recovered by the first fractionator 40, and are used for production of liquid fuel base stocks as mentioned above.

As described above, according to the FT synthesis unit related to the present embodiment, the first cooling unit 82 does not cool the gaseous hydrocarbons which flow through the flowing line 38 to a temperature equal to or lower than the freezing point at which the wax fraction of the hydrocarbons solidifies in the flowing line 38. Thus, it is possible to keep the hydrocarbons of the wax fraction from solidifying and adhering to the inner surface of the pipe of the flowing line 38 through the cooling by the first cooling unit 82.

On the other hand, the first cooling unit 82 cools the gaseous hydrocarbons which flow through the flowing line 38 to a temperature equal to or lower than a condensing point at which the wax fraction condenses in the flowing line 38. Thus, it is possible to condense the wax fraction of the gaseous hydrocarbons synthesized in the reactor 30, and the liquid hydrocarbons of the condensed wax fraction can be separated from the lighter gaseous hydrocarbons by the first gas-liquid separator 86. Moreover, since the first gas-liquid separator 86 is disposed between the first cooling unit 82 and the second cooling unit 84 in the flowing line 38, the liquid hydrocarbons can be separated from the lighter gaseous hydrocarbons by the first gas-liquid separator 86 before the liquid hydrocarbons of the wax fraction are further cooled by the second cooling unit 84. Accordingly, it is possible to keep the hydrocarbons of the wax fraction from solidifying and adhering to the inner surface of the pipe of the flowing line 38 through the cooling of the second cooling unit 84.

Additionally, the second cooling unit 84 does not cool the gaseous hydrocarbons which flow through the flowing line 38 to a temperature equal to or lower than the freezing point at which the middle distillate of the hydrocarbons solidifies in the flowing line 38. Thus, it is possible to keep the hydrocarbons of the middle distillate from solidifying and adhering to the inner surface of the pipe of the flowing line 38 through the cooling of the second cooling unit 84.

On the other hand, the second cooling unit 84 cools the gaseous hydrocarbons which flow through the flowing line 38 to a temperature equal to or lower than a temperature to which the gaseous hydrocarbons are cooled by the first cooling unit 82. Thus, it is possible to condense the middle distillate of the gaseous hydrocarbons synthesized in the reactor, and the liquid hydrocarbons of the condensed middle distillate can be separated from the lighter gaseous hydrocarbons by the second gas-liquid separator 88.

As described above, the liquid hydrocarbons of the wax fraction and the liquid hydrocarbons of the middle distillate can be separated, respectively, from the gaseous hydrocarbons which flow through the flowing line 38. Moreover, it is possible to keep the hydrocarbons from solidifying and adhering to the inner surface of the pipe of the flowing line 38 through the cooling by the first cooling unit 82 and the second cooling unit 84.

Accordingly, there is no problem in that the cooling capacity of the cooling unit decreases and it becomes difficult to cool the gaseous hydrocarbons, or the flowing line is clogged, and the gaseous hydrocarbons is not allowed to flow through the flowing line 38, and it is possible to condense the gaseous hydrocarbons in large quantities as liquid hydrocarbons to stably separate the condensed liquid hydrocarbons from the lighter gaseous hydrocarbons. As a result, a large amount of liquid hydrocarbons can be stably recovered on the basis of the FT synthesis reaction in the bubble column reactor 30.

Additionally, the first cooling unit 82 may cool the gaseous hydrocarbons which flow through the flowing line 38 to 120° C. or lower and 110° C. or higher, and the second cooling unit 84 may cool the gaseous hydrocarbons which flow through the flowing line 38 to a temperature lower than the temperature to which the gaseous hydrocarbons are cooled by the first cooling unit 82 and 40° C. or higher. According to this operation, the aforementioned effect can be reliably exhibited.

In the present embodiment, almost all of the wax fraction of the gaseous hydrocarbons synthesized in the reactor 30 can be condensed by the first cooling unit 82.

Additionally, the second cooling unit 84 may cool the gaseous hydrocarbons which flow through the flowing line 38 to 75° C. or lower and 40° C. or higher. Thus, it is possible to condense the middle distillate of the gaseous hydrocarbons synthesized in the reactor in large quantities, and the liquid hydrocarbons of the condensed middle distillate can be separated from the lighter gaseous hydrocarbons by the second gas-liquid separator 88. Accordingly, the gaseous hydrocarbons can be condensed in large quantities as liquid hydrocarbons, and the condensed liquid hydrocarbons can be separated from the lighter gaseous hydrocarbons. Additionally, according to the liquid fuel synthesizing system 1 related to the present embodiment, the above FT synthesis unit 5 is included. Thus, the gaseous hydrocarbons synthesized in the bubble column reactor 30 are condensed in large quantities as liquid hydrocarbons, and the condensed liquid hydrocarbons are separated from the lighter gaseous hydrocarbons. Thereby, it is possible to stably recover the liquid hydrocarbons, which are to be used to produce liquid fuel base stocks in the upgrading unit 7, in large quantities in the FT synthesis unit 5, and a large amount of liquid fuel base stocks can be stably produced by refining the liquid hydrocarbons.

Although the preferred embodiment of the invention has been described with reference to the accompanying drawings, it is needless to say that the invention is not limited to such embodiments. It is apparent to those skilled in the art that various alternations or modifications can be made in the category as set forth in the claims, and it will be understood that these alternations or modifications naturally belongs to the technical scope of the invention.

For example, the first cooling unit 82 and the second cooling unit 84 are not limited to those shown in the above embodiment if the first cooling unit and the second cooling unit are disposed in the flowing line 38 to cool the fluid flowing through the flowing line 38.

Next, a first verification regarding the relationship between the temperatures to which the hydrocarbons flowing through the flowing line 38 are cooled by the first cooling unit 82, the condensation of the hydrocarbons of the wax fraction will be described.

In this first verification, substance and heat balance calculation in the FT synthesis unit 5 was performed using Aspen-Plus (registered trademark) (made by Aspen Tech Co., Ltd.) which is a general-purpose process simulator used in a plant design, and flow rates (kmol/h) of every hydrocarbon with each carbon number at individual calculation positions set on the flowing line 38 were calculated. As the calculation positions, three places including the outlet of the bubble column reactor 30a, the first gas outlet 86a, and the first liquid outlet 86b, were set. The flow rates of every hydrocarbon with each carbon number at the individual calculation positions were calculated in cases where the temperatures to which the hydrocarbons flowing through the flowing line 38 were cooled by the first cooling unit 82 were 125° C. and 120° C., respectively. In addition, in both cases, the temperature to which the hydrocarbons flowing through the flowing line 38 cooled by the second cooling unit 84 was set to 45° C.

The results are shown in Tables 2 and 3. In addition, Table 2 shows calculation results in a case where the cooling temperature of the hydrocarbons in the first cooling unit 82 is 125° C., and Table 3 shows calculation results in a case where the cooling temperature of the hydrocarbons in the first cooling unit 82 is 120° C.

TABLE 2

| Carbon number | Flow rate (kmol/h) | | |
|---|---|---|---|
| | Outlet of bubble column reactor | First gas outlet | First liquid outlet |
| 30 to | 0.041 | 0.000 | 0.041 |
| 25 to 29 | 0.056 | 0.000 | 0.056 |
| 21 to 24 | 0.248 | 0.001 | 0.247 |
| 15 to 20 | 1.355 | 0.081 | 1.274 |
| 11 to 14 | 1.801 | 0.789 | 1.012 |
| 5 to 10 | 7.578 | 7.022 | 0.556 |
| 1 to 4 | 565.575 | 565.283 | 0.292 |

TABLE 3

| Carbon number | Flow rate (kmol/h) | | |
|---|---|---|---|
| | Outlet of bubble column reactor | First gas outlet | First liquid outlet |
| 30 to | 0.041 | 0.000 | 0.041 |
| 25 to 29 | 0.056 | 0.000 | 0.056 |
| 21 to 24 | 0.248 | 0.000 | 0.248 |
| 15 to 20 | 1.355 | 0.060 | 1.295 |
| 11 to 14 | 1.801 | 0.680 | 1.121 |
| 5 to 10 | 7.578 | 7.016 | 0.562 |
| 1 to 4 | 565.575 | 565.274 | 0.301 |

From Table 2, it was confirmed that, in a case where the cooling temperature of the hydrocarbons in the first cooling unit 82 is 125° C., hydrocarbons with carbon numbers 21 to 24 which are the hydrocarbons of the wax fraction flow through the first gas outlet 86*a*, and it was confirmed that some of the hydrocarbons of the wax fraction are not condensed through the cooling of the hydrocarbons by the first cooling unit 82, and flow to the downstream (second cooling unit side) of the flowing line 38 from the first gas-liquid separator 86 as gaseous hydrocarbons.

On the other hand, it was confirmed from Table 3 that, in a case where the cooling temperature of the hydrocarbons in the first cooling unit 82 is 120° C., almost all the hydrocarbons of the wax fraction which flow through the outlet of the bubble column reactor 30*a* flow through the first liquid outlet 86*b*.

Next, a second verification regarding the relationship between the temperatures to which the hydrocarbons flowing through the flowing line 38 are cooled by the second cooling unit 84 and the condensation of the gaseous hydrocarbons of the middle distillate will be described.

In this second verification, flow rates (kmol/h) of every hydrocarbon with each carbon number at individual calculation positions set on the flowing line 38 were calculated using the same calculating method as the first verification. As the calculation positions, three places including the first gas outlet 86*a*, the second gas outlet 88*a*, and the second liquid outlet 88*b* were set. The flow rates of every hydrocarbon with each carbon number at the individual calculation positions were calculated in cases where the temperatures to which the hydrocarbons flowing through the flowing line 38 were cooled by the second cooling unit 84 were 80° C. and 75° C., respectively. In addition, the cooling temperature of the hydrocarbons in the first cooling unit 82 was 120° C.

The results are shown in Tables 4 and 5. In addition, Table 4 shows calculation results in a case where the cooling temperature of the hydrocarbons in the second cooling unit 84 is 80° C., and Table 5 shows calculation results in a case where the cooling temperature of the hydrocarbons in the second cooling unit 84 is 75° C.

TABLE 4

| Carbon number | Flow rate (kmol/h) | | |
|---|---|---|---|
| | First gas outlet | Second gas outlet | Second liquid outlet |
| 30 to | 0.000 | 0.000 | 0.000 |
| 25 to 29 | 0.000 | 0.000 | 0.000 |
| 21 to 24 | 0.000 | 0.000 | 0.000 |
| 15 to 20 | 0.053 | 0.001 | 0.052 |
| 11 to 14 | 0.677 | 0.151 | 0.526 |
| 5 to 10 | 9.814 | 9.186 | 0.628 |
| 1 to 4 | 565.830 | 565.691 | 0.139 |

TABLE 5

| Carbon number | Flow rate (kmol/h) | | |
|---|---|---|---|
| | First gas outlet | Second gas outlet | Second liquid outlet |
| 30 to | 0.000 | 0.000 | 0.000 |
| 25 to 29 | 0.000 | 0.000 | 0.000 |
| 21 to 24 | 0.000 | 0.000 | 0.000 |
| 15 to 20 | 0.053 | 0.000 | 0.053 |
| 11 to 14 | 0.677 | 0.111 | 0.566 |
| 5 to 10 | 9.814 | 8.532 | 1.282 |
| 1 to 4 | 565.830 | 565.614 | 0.216 |

From Table 4, it was confirmed that, in a case where the cooling temperature in the second cooling unit 84 is 80° C., hydrocarbons with carbon numbers 15 to 20 which are the hydrocarbons of the middle distillate flow through the second gas outlet 88*a*, and it was confirmed that some of the hydrocarbons of the middle distillate are not condensed through the cooling of the hydrocarbons by the second cooling unit 84, and flow to the downstream of the flowing line 38 from the second gas-liquid separator 88 as gaseous hydrocarbons.

On the other hand, it was confirmed from Table 5 that, in a case where the cooling temperature in the second cooling unit 84 is 75° C., all of hydrocarbons with carbon numbers 15 to 20 among the hydrocarbons of the middle distillate which flow through the first gas outlet 86*a* flow through the second liquid outlet 88*b*.

INDUSTRIAL APPLICABILITY

According to the hydrocarbon synthesis reaction apparatus, hydrocarbon synthesis reaction system, and liquid hydrocarbon recovery method of the invention, it is possible to keep the hydrocarbons from solidifying and adhering to the inner surface of the pipe of the flowing line 38, and it is possible to condense the gaseous hydrocarbons in large quantities as liquid hydrocarbons to stably separate the condensed liquid hydrocarbons from the lighter gaseous hydrocarbons.

REFERENCE SIGN LIST

1: LIQUID FUEL SYNTHESIZING SYSTEM (HYDROCARBON SYNTHESIS REACTION SYSTEM)
3: SYNTHESIS GAS PRODUCTION UNIT
5: FT SYNTHESIS UNIT (HYDROCARBON SYNTHESIS REACTION APPARATUS)
7: UPGRADING UNIT
30: BUBBLE COLUMN REACTOR (REACTOR)
38: FLOWING LINE
82: FIRST COOLING UNIT
84: SECOND COOLING UNIT
86: FIRST GAS-LIQUID SEPARATOR (FIRST SEPARATING UNIT)
88: SECOND GAS-LIQUID SEPARATOR (SECOND SEPARATING UNIT)

The invention claimed is:

1. A hydrocarbon synthesis reaction apparatus which synthesizes hydrocarbons by a Fischer-Tropsch synthesis reaction caused by contacting a synthesis gas including carbon monoxide gas and hydrogen gas as main components and a catalyst slurry having solid catalyst particles suspended in a liquid, the apparatus comprising:
 a reactor which synthesizes liquid hydrocarbons and gaseous hydrocarbons by the Fischer-Tropsch synthesis reaction;
 a flowing line through which the gaseous hydrocarbons flow to the downstream from the reactor;
 a first cooling unit disposed in the flowing line to cool the gaseous hydrocarbons which flow through the flowing line;
 a second cooling unit disposed downstream of the first cooling unit in the flowing line;
 a first separating unit disposed between the first cooling unit and the second cooling unit in the flowing line to separate a liquid wax fraction comprising hydrocarbons having 21 or more carbon atoms and a liquid middle distillate comprising hydrocarbons having 11 to 20 carbon atoms condensed by the first cooling unit from the gaseous hydrocarbons; and
 a second separating unit which separates the liquid middle distillate condensed by the second cooling unit from the gaseous hydrocarbons,
 wherein the first cooling unit is configured to cool the gaseous hydrocarbons which flow through the flowing line to 110 to 120° C., and
 wherein the second cooling unit is configured to cool the gaseous hydrocarbons which flow through the flowing line to 40 to 75° C.

2. A hydrocarbon synthesis reaction system comprising:
 the hydrocarbon synthesis reaction apparatus according to claim 1,
 a synthesis gas production unit which reforms a hydrocarbon feedstock to produce the synthesis gas and supplies the synthesis gas to the reactor, and
 an upgrading unit which refines the liquid hydrocarbons to produce liquid fuel base stocks.

3. A liquid hydrocarbon recovery method of recovering gaseous hydrocarbons which flow through a flowing line as liquid hydrocarbons, in a hydrocarbon synthesis reaction apparatus including a reactor which synthesizes the liquid hydrocarbons and the gaseous hydrocarbons by a Fischer-Tropsch synthesis reaction by contacting a synthesis gas including carbon monoxide gas and hydrogen gas as main components and catalyst slurry having solid catalyst particles suspended in a liquid, and a flowing line through which the gaseous hydrocarbons flow to the downstream from the reactor,
 the hydrocarbon synthesis reaction apparatus includes a first cooling unit disposed in the flowing line to cool the gaseous hydrocarbons which flow through the flowing line; and a second cooling unit disposed downstream of the first cooling unit in the flowing line,
 the liquid hydrocarbon recovery method comprising:
 cooling the gaseous hydrocarbons which flow through the flowing line to 110 to 120° C. by the first cooling unit;
 separating a liquid wax fraction comprising hydrocarbons having 21 or more carbon atoms and a liquid middle distillate comprising hydrocarbons having 11 to 20 carbon atoms condensed by the first cooling unit from the gaseous hydrocarbons, between the first cooling unit and the second cooling unit in the flowing line;
 cooling the gaseous hydrocarbons which flow through the flowing line to 40 to 75° C. by the second cooling unit; and
 separating the liquid middle distillate condensed by the second cooling unit from the gaseous hydrocarbons.

* * * * *